Oct. 27, 1931.  E. T. FERNGREN  1,829,639
METHOD AND APPARATUS FOR DRAWING SHEET GLASS
Original Filed Oct. 12, 1922   3 Sheets-Sheet 1

INVENTOR
Enoch T. Ferngren.
BY C. A. Rowley
ATTORNEY

INVENTOR
Enoch T. Ferngren
By C. H. Rowley
ATTORNEY

Oct. 27, 1931.                E. T. FERNGREN                1,829,639
                METHOD AND APPARATUS FOR DRAWING SHEET GLASS
                Original Filed Oct. 12, 1922        3 Sheets-Sheet 3
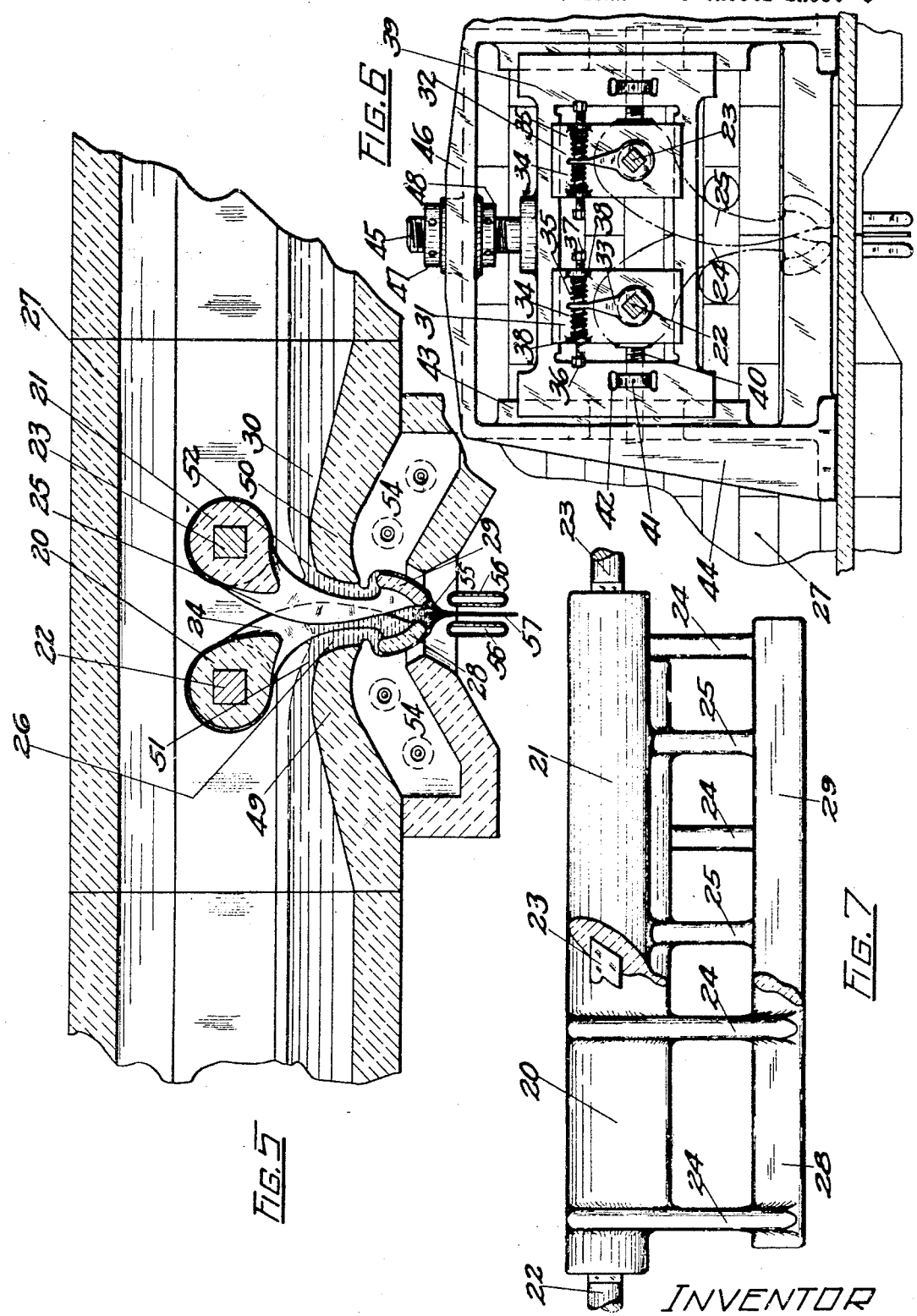
INVENTOR
Enoch T. Ferngren.
By C. A. Rowley
ATTORNEY Patented Oct. 27, 1931

1,829,639

UNITED STATES PATENT OFFICE

ENOCH T. FERNGREN, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR DRAWING SHEET GLASS

Application filed October 12, 1922, Serial No. 593,962. Renewed May 14, 1930.

This invention relates to the art of drawing sheet glass, and more particularly to a method and apparatus for drawing sheet glass downwardly from the source of supply.

One of the principal difficulties heretofore encountered in drawing sheet glass downward has been to provide a freely flowing source of molten glass, and at the same time so support and suspend this sheet source that there would be adequate resistance to the drawing stress, so that the sheet would not "run away" under the influence of gravity. It is also difficult to eliminate surface markings and lines of strain on any sheet drawn downwardly through an orifice, due to the tendency of the cool plastic glass to adhere to the edges of the orifice from which it flows.

The apparatus here disclosed aims to overcome these obstacles by flowing the molten glass downwardly around and through a partially hollow anchoring tile or similar supporting member positioned in the orifice or slot. This member is so perforated or honeycombed with passages that a large surface area is presented to which the flowing glass may adhere. This resistance will be imparted, in the main, to that glass which flows to the interior of the sheet source, so that the glass flowing down the outside of the supporting member may be kept relatively hot and in a higher degree of fluidity so that the tendency to adhere to the walls of the receptacle will be greatly decreased and surface markings practically eliminated. The apparatus further embodies a preferred form of receptacle for delivering the molten glass to the drawing orifice in a proper state of plasticity, and also a preferred form of yielding support for the anchoring member or members so that the drawing stresses in the sheet source may be made more or less self-compensating and constant.

The invention will be more clearly understood and further objects and advantages will become apparent from the following detailed description of two forms of apparatus adapted to carry out the principles of this invention.

In the accompanying drawings:

Fig. 5 is a longitudinal vertical section through a different modification, embodying a preferred form of adjustable supporting or anchoring means.

Fig. 6 is an end elevation showing the yieldable and adjustable supports for the form of anchoring member disclosed in Fig. 5.

Fig. 7 is a side elevation of this anchoring or supporting member, one of the parts thereof being broken away to facilitate the disclosure.

Figure 1:
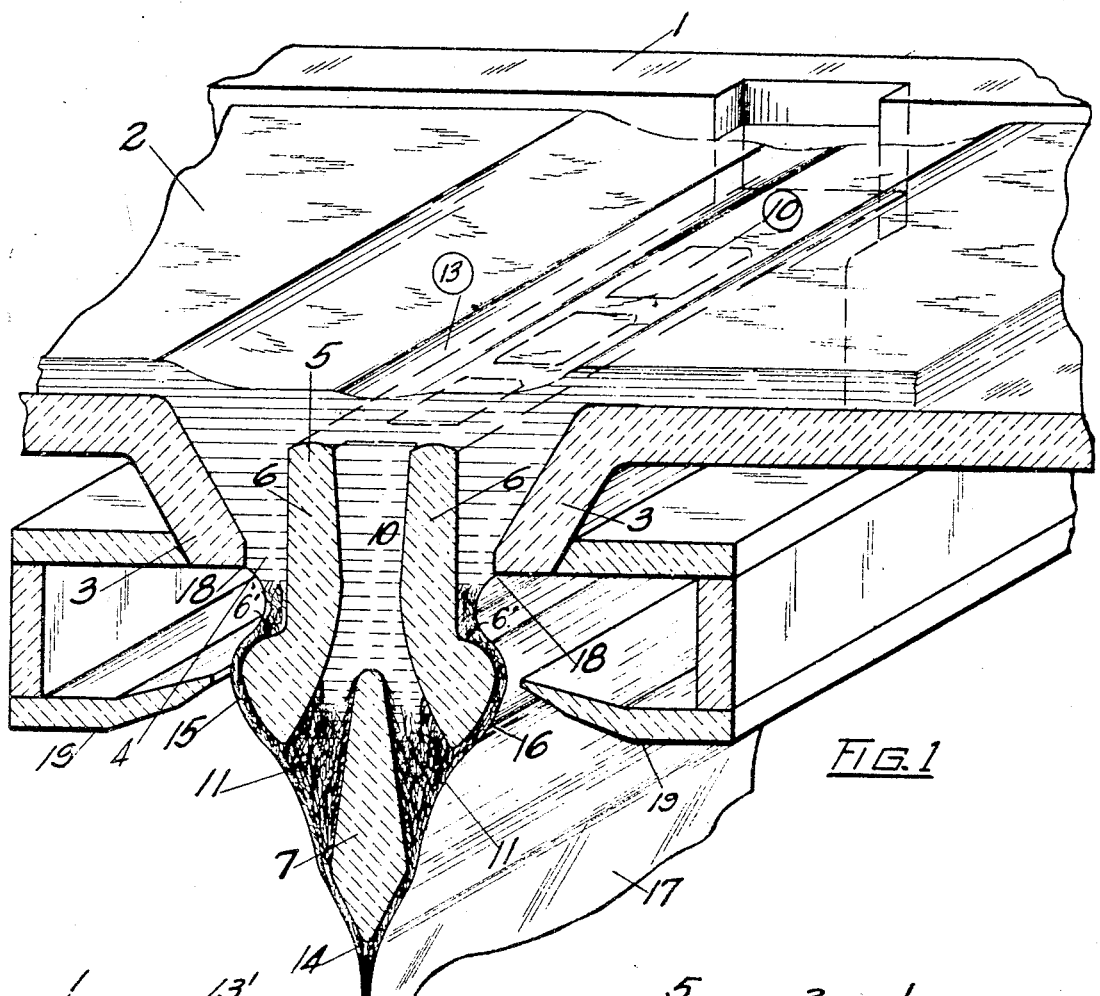
Fig. 1 is a perspective, partly in vertical section, through one form of the apparatus.
Figure 2:
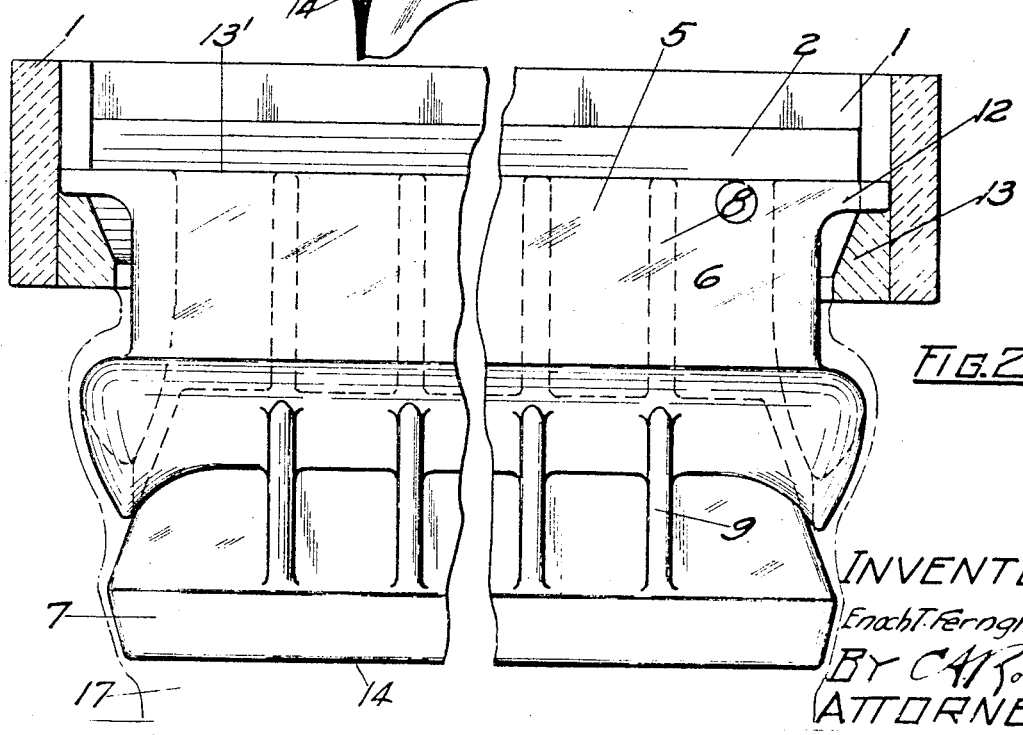
Fig. 2 is a transverse vertical section through the receptacle, showing the anchoring tile in side elevation. The outline of the flowing glass is indicated in broken lines.
Figure 3:
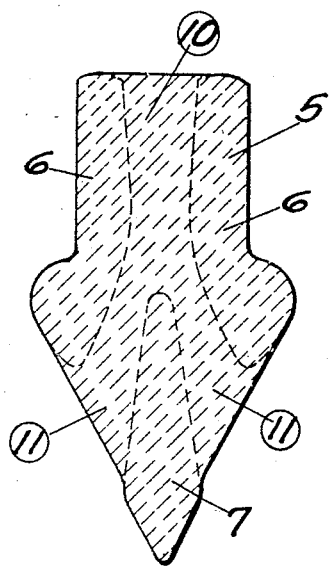
Fig. 3 is a transverse vertical section through the anchoring member.
Figure 4:
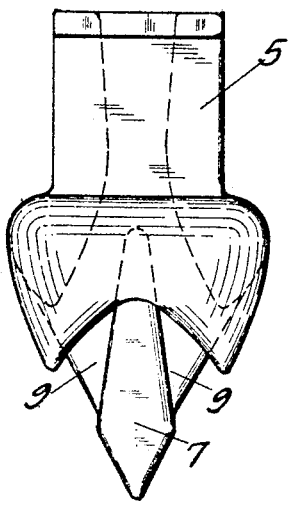
Fig. 4 is an end elevation of the anchoring member.

Referring first to the form of the invention shown in Figs. 1 to 4, inclusive, 1 indicates a portion of the shallow receptacle for the molten glass 2 which is delivered thereto from any suitable source of supply such as a continuous tank furnace. At 3 the bottom walls of the receptacle 1 slope downwardly to the transverse slot or orifice 4, forming a sort of outlet funnel for the molten glass.

Within this slot or passage 4, is positioned the anchoring tile or supporting member 5 which may be given a variety of forms, its function being to act as a guide and supporting means for the molten glass which flows down to form the sheet source. As here illustrated, this member consists of a pair of upper parallel side members 6 and a third central member 7 positioned parallel to but below the members 6. The three members 6 and 7 are joined at intervals by a series of cross-braces or partitions 8 and 9, which serve to hold the side members in spaced relation and at the same time provide a series of interior passages 10 and 11 through which the molten glass may flow. The entire tile may be supported in any suitable manner, and as shown is carried at its ends by supporting arms 12 resting on ledges 13 at the ends of the slot or orifice. Each side member 6 of the anchoring tile 5 is provided adjacent its lower end with an outwardly extending ridge or shelf 6', each of which provides a means for accumulating a supply of molten glass and temporarily supporting the same on the outer side of the tile member before it flows around the inwardly curving lower ends of the members 6 to merge with the glass flowing through the interior passage 10 to form the sheet source at the lower edge of the anchoring tile.

It will be noted that the supporting tile is positioned so that its upper face 13' is below the normal level of the molten glass 2, within the receptacle 1, and the lower edge 14 of the central member 7 is positioned considerably below the slot or orifice 4. The molten glass which is delivered to the outlet passage 4 in a fairly hot and fluid condition will flow down through the interior passages 10 and 11 in the supporting tile and will also flow in thin streams around the exterior thereof as indicated at 15 and 16. The glass flowing through the interior passages of the supporting tile will become somewhat cooled and will tend to adhere to the comparatively large area of tile surface to which it is exposed, thus developing a sufficient resistance to the down flow of the glass to overcome the influence of gravity and suspend the mass of glass forming the source of sheet 17 which is being drawn away from the lower edge of this glass mass.

The molten glass flowing around the exterior of the supporting tile as at 15 and 16, is maintained in a more highly heated and fluid condition, so that it will flow freely and not tend to adhere to the draw-off lips 18 at the sides of the slot or orifice. To maintain the proper heated condition of this exterior flow of glass, heat is directed from chambers 19 against the two sides of the flowing glass adjacent the exit orifice.

The operation of this apparatus should be apparent from the above description. The molten glass is drawn downwardly in the form of a sheet 17 from the plastic glass which is practically suspended around member 7. As the glass is drawn away in sheet form, the suspended source is continually replenished from the glass flowing down from the receptacle. The sheet may be pulled down by any suitable drawing means and may be bent into the horizontal plane while still somewhat plastic, or may be carried continuously downward in the vertical plane until it is sufficiently set to be cut into sections.

A second form of the invention which has several preferred features is illustrated in Figs. 5 to 8, inclusive. In this apparatus the anchoring or supporting means for the sheet source comprises a pair of similar pivoted members 20 and 21, mounted at their upper ends on suitable pivots or shafts 22 and 23, respectively. Sets of interlocking fingers 24 and 25 project downwardly from the members 20 and 21 through the slot or passage 26 in the glass-containing receptacle 27. The fingers 24 are joined at their lower ends, below the slot 26, by a cross-bar 28, whereas the arms 25 are joined by a similar parallel cross-bar 29. The molten glass 30 in receptacle 27 flows down through slot 26 between the interlocking fingers 24 and 25, and between and around the cross-bars 28 and 29, in much the same manner that it flows through and around the anchoring tile 5 in the modification first described. That is to say, the upper edges of the cross bars 28 and 29 constitute, in effect, outwardly extending ridges or shelves, each of which provides a means for accumulating a supply of molten glass and temporarily supporting the same before it flows downwardly around the said cross bars to the sheet source. In the present apparatus, however, the two components of the supporting member are independently adjustable in several ways as will be presently described, whereby the proportions of the various glass passages may be suitably varied.

At each end the supporting shafts 22 and 23 for the members 20 and 21 are carried in a pair of similar bearing blocks 31 and 32. On the end of each of the shafts 20 and 21 is fixed an upwardly extending arm 33, which is held in a normal vertical position between a pair of compression springs 34 and 35. These springs 34 and 35 abut at their outer ends against adjusting screws 36 and 37, respectively, which are carried in fixed ears 38 on the supporting block 31 or 32. In this way the member 20 or 21, is normally held in a fixed position, but may oscillate one way or another against the force of the springs 34 or 35 when unusual stresses are applied to the downwardly projecting glass supporting portion of the anchoring member. The blocks 31 and 32 are mounted for horizontal sliding movement toward or from one another in a vertically slidable bearing block 39. A screw 40 secured at one end to the block 31 or 32, projects through a suitable opening in the block 39, and a nut 41 mounted on this screw is carried in a slot or opening 42 in the bearing block 39. By suitably manipulating one or both of the nuts 41, the members 20 and 21 may be properly adjusted toward or from one another, or may be properly centered within the passage 26 in receptacle 27. The supporting block 39 is vertically slidable on guides 43 of a fixed supporting bracket 44 mounted in any suitable manner at the outer side of the machine. A screw 45 fixed to the block 39 projects upwardly through an opening in the upper cross member 46 of bracket 44. A pair of nuts 47 and 48 mounted on screw 45 and placed at the opposite sides of cross member 46 will support and hold the block 39 in fixed position, but will allow the block to be adjusted vertically as desired. It will be noted that by means of the mechanism just described, the glass supporting or anchoring members may be adjusted vertically or horizontally as a unit, the two components may be adjusted toward and from one another to vary the size and direction of the glass passages therein, and also the members are automatically yieldable to compensate for unusual drawing strains.

Figure 8:
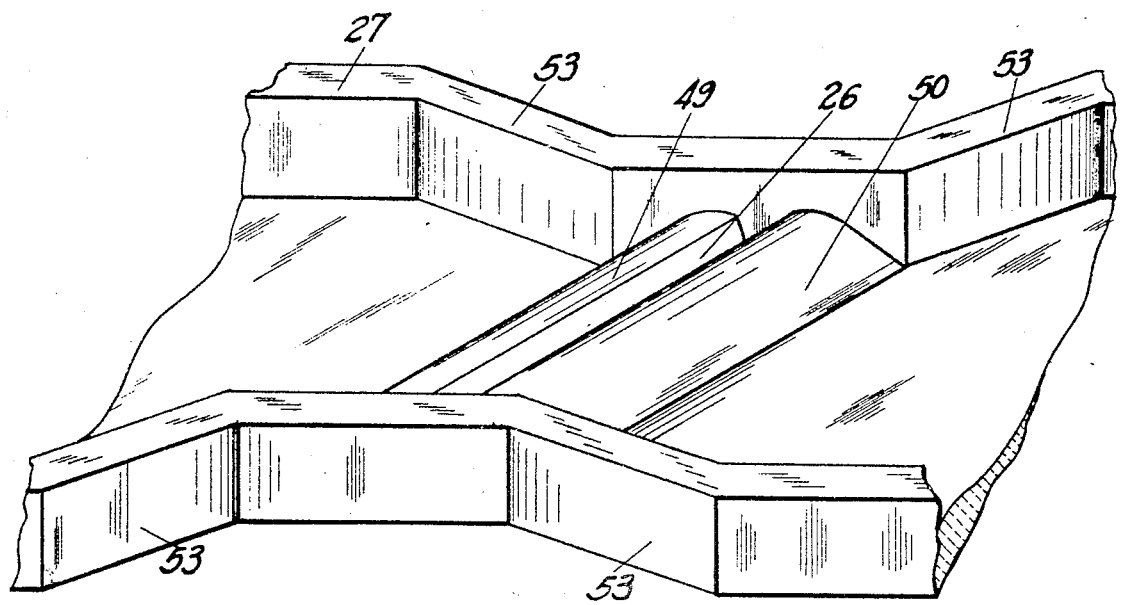
Fig. 8 is a perspective illustrating the design of the receptacle for delivering the molten glass to the draw-point.

As shown more particularly in Figs. 5 and 8, the floor of the receptacle 27 for the molten glass adjacent the passage 26 is formed by a pair of upwardly sloping bottom members 49 and 50. These members deliver the molten glass to the slot 26 in rather shallow streams 51 and 52, and also allow the glass to cool down to the proper state of plastic viscosity, for flowing through and being drawn downwardly from the anchoring members 20 and 21. It will be noted that the side walls of receptacle 27 converge inwardly at 53 to the foot of the upwardly sloping bottom members 49 and 50. In this way the streams of glass flowing toward the slot are first gradually narrowed and then become gradually shallower as they approach the slot. This all aids in expediting the cooling of the fluid glass and delivering it to the draw-off slot in the proper plastic condition.

At either side of the source are heating chambers 54, which direct their heat against the streams of glass flowing from the edges of the passage 26, and around the exterior of the cross-bars 28 and 29. This outer glass is thus maintained in a fluid and free flowing condition to avoid the formation of surface blemishes. As this surface glass flows down toward the meniscus or sheet source 55, below the bars 28 and 29, it comes under the influence of the coolers 56, of any approved form, and is set to such a degree of plasticity that it may be drawn smoothly into the surfaces of the sheet 57.

If unusual stresses occur in the glass mass being drawn into sheet form, the bars 28 and 29 will yield somewhat toward one another against the springs 35, but as this stress is relieved the springs will again tend to spread the bars and compensate for the lessening tension. In this way the drawing stresses and the resistance offered by the plastic mass are maintained in a state of comparative equilibrium, and a more even and uniform sheet is produced.

Claims:

1. The method of forming continuous sheet glass consisting in flowing a plurality of separated streams of molten glass, of less width but greater thickness than the sheet, downwardly in contact with supporting surfaces, also flowing a pair of streams of molten glass downwardly around the separated streams, and uniting all of said streams to form a source from which the glass sheet is drawn.

2. In an apparatus for drawing sheet glass, a container for a supply of molten glass, and a honey-combed member around and through which molten glass flows from the supply, the glass being drawn from the member in sheet form.

3. In an apparatus for drawing sheet glass, a container for a supply of molten glass, and a pair of interlocking members forming a series of interior and exterior passages through which the glass flows from the supply, and from which it is drawn away in sheet form, the members being adjustable to vary the size of the interior passages.

4. In an apparatus for drawing sheet glass, a receptacle for the molten glass, having an elongated passage in its bottom, a honey-combed member positioned in the passage around and through which the glass flows, and is drawn away from the lower end in sheet form, and means for heating the glass as it flows around the member.

5. In an apparatus for drawing sheet glass, a receptacle for the molten glass, having an elongated orifice in its bottom, and a pair of interlocking members positioned in the orifice, and forming a series of interior and exterior passages for the molten glass, the members being adjustable to vary the size of the interior passages.

6. In an apparatus for drawing sheet glass, a receptacle for the molten glass, having an elongated orifice in its bottom, and a pair of pivoted members having interlocking fingers projecting downwardly through the orifice and forming a series of interior and exterior passages for the molten glass, and means for holding the members under yielding tension so that the capacity of the glass passages will vary in accordance with the drawing stress under which the sheet is drawn away from the lower ends of the members.

7. In an apparatus for drawing sheet glass, a receptacle for the molten glass, having an elongated orifice in its bottom, and a pair of pivoted members having interlocking fingers projecting downwardly through the orifice and forming a series of interior and exterior passages for the molten glass, the fingers of each member being joined at their lower ends by a continuous cross-bar, the glass being drawn away in sheet form from below this pair of bars.

8. In an apparatus for drawing sheet glass, a receptacle for the molten glass, having an elongated orifice in its bottom, and a pair of pivoted members having interlocking fingers projecting downwardly through the orifice and forming a series of interior and exterior passages for the molten glass, the fingers of each member being joined at their lower ends by a continuous cross-bar, the glass being drawn away in sheet form from below this pair of bars, and means for holding the members under yielding tension so that the capacity of the glass passages will vary in accordance with the drawing stress under which the sheet is drawn away from the lower ends of the members.

9. The method of producing sheet glass which consists in flowing three separated streams of molten glass from a single body through a discharge passage, in forming right and left exposed supply bodies of glass from the two outer streams beneath the passage, and in causing the glass of the central stream and the overflow from the supply bodies to merge at a point beneath the said bodies and to advance therefrom in sheet formation.

10. The method of producing sheet glass which consists in forming three separated flows of molten glass from a single body within a discharge orifice, in forming right and left exposed supply bodies from two of the said flows of glass beneath the orifice, and in causing the glass of the central flow and the overflow from the supply bodies to merge at a point beneath the supply bodies and to advance therefrom in sheet formation by applying drawing force to the glass along its merging zone.

11. The method of producing sheet glass which consists in forming three separated flows of molten glass from a single body within a discharge orifice, in forming right and left exposed supply bodies from two of the said flows of glass beneath the said orifice, and in causing the glass of the central flow and the overflow from the supply bodies to merge at a point beneath the said supply bodies and to advance from said point in sheet formation by applying drawing force to the glass along its merging zone and during drawing applying fluency increasing heat to the glass forming the supply bodies.

12. The method of producing sheet glass which consists in flowing three separated streams of molten glass from a single body through a discharge passage, in forming right and left exposed supply bodies of glass from two of the said streams beneath the passage, and in causing the glass of the central stream and the overflow from the supply bodies to merge at a point beneath the said supply bodies and to advance from said point in sheet formation by applying drawing force to the glass along its merging zone and during drawing applying fluency increasing heat to the glass forming the supply bodies while causing a loss of heat from the outer surfaces of the glass in the merging zone.

13. The method of producing sheet glass which consists in forming three adjacent stream flows of molten glass from a single body within a discharge orifice, in forming right and left exposed supply bodies from two of the said streams beneath the orifice, in causing the glass of the central stream and the overflow from the supply bodies to merge at a point beneath the said supply bodies and to advance therefrom in sheet formation, and during the sheet forming, heating the surface layers of the supply bodies prior to their advance into the merging zone.

14. The method of producing sheet glass which consists in forming three adjacent, supported, stream flows of molten glass from a single body within a discharge orifice, in forming right and left exposed supply bodies from two of the said flows beneath the orifice, in causing the glass of the central flow and the overflow from the supply bodies to merge at a point beneath the said bodies and to advance from said point in sheet formation, and during the sheet forming, heating the surface layers of the supply bodies prior to their advance into the merging zone, while cooling opposite surface layers of the sheet below its point of formation.

15. The method of obtaining a sheet from a body of molten glass which is discharging downward through an orifice, which consists in supplying glass of plastic nature to the orifice to form a discharging body, in providing retarding means for building up surface supplying bodies and to reduce the discharging velocity in and below the orifice, in surrounding the discharging portion of the body which is beneath the orifice with a heating atmosphere to induce fluency in its external portion, and in producing a sheet of glass by accelerating the downward movement of the discharging glass beneath the point of heat application thereto.

16. The process of drawing a sheet of glass which consists in converging and merging three descending streams of plastic glass into a sheet supplying source, in checking the descent of two of the streams above the common merging point to build up right and left supply bodies adjacent said point, in increasing the fluidity of said bodies by local superheating, and in drawing a sheet of glass from the source.

17. The method of making sheet glass, which consists in producing an enlarged end flow of plastic glass beneath an orifice, in providing internal under-support and clinging support to the flow at its point of enlargement, in heating the exterior of the flow around its enlarged portion and in drawing a sheet of glass therefrom while inducing a more advanced state of plasticity by cooling the previously heated portion, and in concurrently maintaining the quantity available at the enlarged end by adequate release of glass flow from the orifice.

18. In an apparatus for forming continuous sheet glass, a pair of similar directing members arranged adjacent one another so as to provide an open passage therebetween, means for flowing molten glass onto the upper edges of the members, the glass flowing down between the members, and also down the outer sides thereof, the three streams uniting below the members and being drawn away in sheet form, the members being provided on their outer faces with means for retaining a supply body of glass in each outer stream adjacent the point where the streams merge.

19. In an apparatus for forming continuous sheet glass, a pair of similar directing members arranged adjacent one another so as to provide an open passage therebetween, means for flowing molten glass onto the upper edges of the members, the glass flowing down between the members, and also down the outer sides thereof, the three streams uniting below the members and being drawn away in sheet form, the members being provided on their outer faces with glass retaining ledges.

20. In an apparatus for forming continuous sheet glass, a pair of similar directing members arranged adjacent one another so as to provide an open passage therebetween, means for flowing molten glass onto the upper edges of the members, the glass flowing down between the members, and also down the outer sides thereof, the three streams uniting below the members and being drawn away in sheet form, the members being provided on their outer faces with means for retaining a supply body of glass in each outer stream adjacent the point where the streams merge, and means for applying heat to these glass supplies.

21. In an apparatus for forming continuous sheet glass, a pair of similar directing members arranged adjacent one another so as to provide an open passage therebetween, means for flowing molten glass onto the upper edges of the members, the glass flowing down between the members, and also down the outer sides thereof, the three streams uniting below the members and being drawn away in sheet form, the members being provided on their outer faces with glass retaining ledges, and means for heating the glass on the ledges.

22. In an apparatus for forming continuous sheet glass, a pair of directing members between and around which molten glass flows to form a sheet source at the lower ends of the members, and means for supporting the members whereby they may move toward or from each other in response to variations in the sheet drawing stresses.

23. In an apparatus for forming continuous sheet glass, a pair of directing members between and around which molten glass flows to form a sheet source at the lower ends of the members, and means for yieldably supporting the members.

24. In an apparatus for forming continuous sheet glass, a pair of directing members between which molten glass flows to a sheet source, and means for holding these members yieldably against the stream of flowing glass.

25. In an apparatus for forming continuous sheet glass, a pair of directing members between which molten glass flows to a sheet source, suspended from the lower ends of the members, and means for holding the members yieldably against the flowing glass stream.

26. In an apparatus for forming continuous sheet glass, a receptacle for molten glass having an orifice in its bottom, a pair of directing members extending down through the orifice, the molten glass flowing down in three separated streams, one between the members, and one between each member and the adjacent side of the orifice, and means for mounting the members whereby they may yield toward or from one another to vary the proportionate volumes of the side and central streams.

27. In a glass drawing apparatus, the combination of vertically disposed conforming means down opposite sides of which glass is permitted to flow in film formation, and means for yieldably supporting said conforming means in position.

28. In a glass drawing apparatus, the combination of vertically disposed conforming means down opposite sides of which glass is permitted to flow in film formation, and adjustable yielding supporting means for said conforming means.

29. In a glass drawing apparatus, the combination of a vertically disposed two-part conforming member, and means for permitting relative yieldability between said parts.

30. In a glass drawing apparatus, the combination of a two-part vertically disposed conforming means, said parts cooperating to form a central passage, means for delivering glass to the outer sides of said conforming means and to the interior of the passage, and means whereby one of said parts may be adjusted with respect to its cooperating part.

Signed at Charleston, in the county of Kanawha, and State of West Virginia, this 5th day of October, 1922.

ENOCH T. FERNGREN.